United States Patent
Guo et al.

(10) Patent No.: US 9,013,824 B1
(45) Date of Patent: Apr. 21, 2015

(54) DATA STORAGE DEVICE COMPRISING DUAL READ SENSORS AND DUAL SERVO CHANNELS TO IMPROVE SERVO DEMODULATION

(71) Applicant: Western Digital Technologies, Inc., Irvine, CA (US)

(72) Inventors: Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/295,475

(22) Filed: Jun. 4, 2014

(51) Int. Cl.
  G11B 21/02 (2006.01)
  G11B 5/58 (2006.01)
  G11B 5/596 (2006.01)

(52) U.S. Cl.
  CPC .................................. *G11B 5/59655* (2013.01)

(58) Field of Classification Search
  CPC .... G11B 5/6005; G11B 5/59633; G11B 5/54; G11B 5/58; G11B 5/584; G11B 5/5508; G11B 5/59688
  USPC ......... 360/51, 48, 77.02, 77.08, 78.04, 78.14, 360/78.12, 75, 77.01, 61, 76, 77.07
  See application file for complete search history.

(56) References Cited

U.S. PATENT DOCUMENTS

| | | |
|---|---|---|
| 4,012,781 A | 3/1977 | Lin |
| 5,229,901 A | 7/1993 | Mallary |
| 5,270,892 A | 12/1993 | Naberhuis |
| 5,309,305 A | 5/1994 | Nepela et al. |
| 5,388,014 A | 2/1995 | Brug et al. |
| 5,508,868 A | 4/1996 | Cheng et al. |
| 5,523,904 A | 6/1996 | Saliba |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,014,283 A | 1/2000 | Codilian et al. |
| 6,021,024 A | 2/2000 | Akiyama et al. |
| 6,052,076 A | 4/2000 | Patton, III et al. |
| 6,052,250 A | 4/2000 | Golowka et al. |
| 6,067,206 A | 5/2000 | Hull et al. |
| 6,071,007 A | 6/2000 | Schaenzer et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,104,562 A | 8/2000 | Ottesen et al. |
| 6,122,133 A | 9/2000 | Nazarian et al. |

(Continued)

*Primary Examiner* — Nabil Hindi (57) ABSTRACT

A data storage device is disclosed comprising a disk comprising a plurality of servo tracks defined by servo sectors, wherein each servo sector comprises a plurality of servo bursts. A head comprises a first read sensor and a second read sensor separated from the first read sensor by a cross-track spacing. A first servo channel processes a first read signal emanating from the first read sensor to generate a first position signal based on at least two servo bursts read using the first read sensor. A second servo channel processes a second read signal emanating from the second read sensor to generate a second position signal based on at least two servo bursts read using the second read sensor. A position error signal (PES) is generated based on the first position signal and the second position signal, and the head is servoed over the disk based on the PES.

25 Claims, 5 Drawing Sheets

(56) References Cited

U.S. PATENT DOCUMENTS

| | | | |
|---|---|---|---|
| 6,122,135 A | 9/2000 | Stich | |
| 6,141,175 A | 10/2000 | Nazarian et al. | |
| 6,154,335 A | 11/2000 | Smith et al. | |
| 6,157,510 A | 12/2000 | Schreck et al. | |
| 6,160,368 A | 12/2000 | Plutowski | |
| 6,181,502 B1 | 1/2001 | Hussein et al. | |
| 6,191,925 B1 | 2/2001 | Watson | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,216,242 B1 | 4/2001 | Schaenzer | |
| 6,243,223 B1 | 6/2001 | Elliott et al. | |
| 6,271,998 B1 | 8/2001 | Coehoorn et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,311,551 B1 | 11/2001 | Boutaghou | |
| 6,320,718 B1 | 11/2001 | Bouwkamp et al. | |
| 6,341,102 B1 | 1/2002 | Sato et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,369,982 B2 | 4/2002 | Saliba | |
| 6,388,829 B1 * | 5/2002 | Nazarian | 360/48 |
| 6,449,131 B2 | 9/2002 | Guo et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,496,333 B1 | 12/2002 | Han et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,606,216 B1 * | 8/2003 | Liikanen et al. | 360/77.08 |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,674,618 B2 | 1/2004 | Engel et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,842,312 B1 | 1/2005 | Alstrin et al. | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,947,247 B2 | 9/2005 | Schwarz et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 * | 2/2006 | Miyamura et al. | 360/75 |
| 6,999,263 B1 | 2/2006 | Melkote et al. | |
| 6,999,267 B1 | 2/2006 | Melkote et al. | |
| 7,002,777 B2 | 2/2006 | Ogawa et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,106,549 B2 | 9/2006 | Asakura | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,193,807 B1 | 3/2007 | Liikanen et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al. | |
| 7,215,504 B1 | 5/2007 | Bennett | |
| 7,215,514 B1 | 5/2007 | Yang et al. | |

(56) References Cited

U.S. PATENT DOCUMENTS

| | | |
|---|---|---|
| 7,224,546 B1 | 5/2007 | Orakcilar et al. |
| 7,239,465 B1 | 7/2007 | Watson et al. |
| 7,242,547 B2 | 7/2007 | Ogawa |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,259,927 B2 | 8/2007 | Harris |
| 7,265,933 B1 | 9/2007 | Phan et al. |
| 7,271,970 B2 | 9/2007 | Tsuchiya |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,405,907 B2 | 7/2008 | Raastad |
| 7,408,730 B2 | 8/2008 | Yamagishi |
| 7,420,758 B2 | 9/2008 | Inoue et al. |
| 7,433,143 B1 | 10/2008 | Ying et al. |
| 7,436,632 B2 | 10/2008 | Li et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,193 B2 | 3/2009 | Albrecht et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,652,847 B2 | 1/2010 | Weiss et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,009,388 B2 | 8/2011 | Oh et al. |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,139,301 B1 | 3/2012 | Li et al. |
| 8,144,424 B2 | 3/2012 | Dugas et al. |
| 8,145,934 B1 | 3/2012 | Ferris et al. |
| 8,179,626 B1 | 5/2012 | Ryan et al. |
| 8,189,286 B1 * | 5/2012 | Chen et al. .............. 360/77.08 |
| 8,208,228 B2 | 6/2012 | Maat et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,880 B2 | 8/2013 | Gao et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |

(56) References Cited

U.S. PATENT DOCUMENTS

| | | |
|---|---|---|
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2005/0036241 A1 | 2/2005 | Tsuda et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0223199 A1 | 8/2013 | Lund et al. |
| 2013/0242428 A1 | 9/2013 | Tetzlaff et al. |

\* cited by examiner

DATA STORAGE DEVICE COMPRISING DUAL READ SENSORS AND DUAL SERVO CHANNELS TO IMPROVE SERVO DEMODULATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
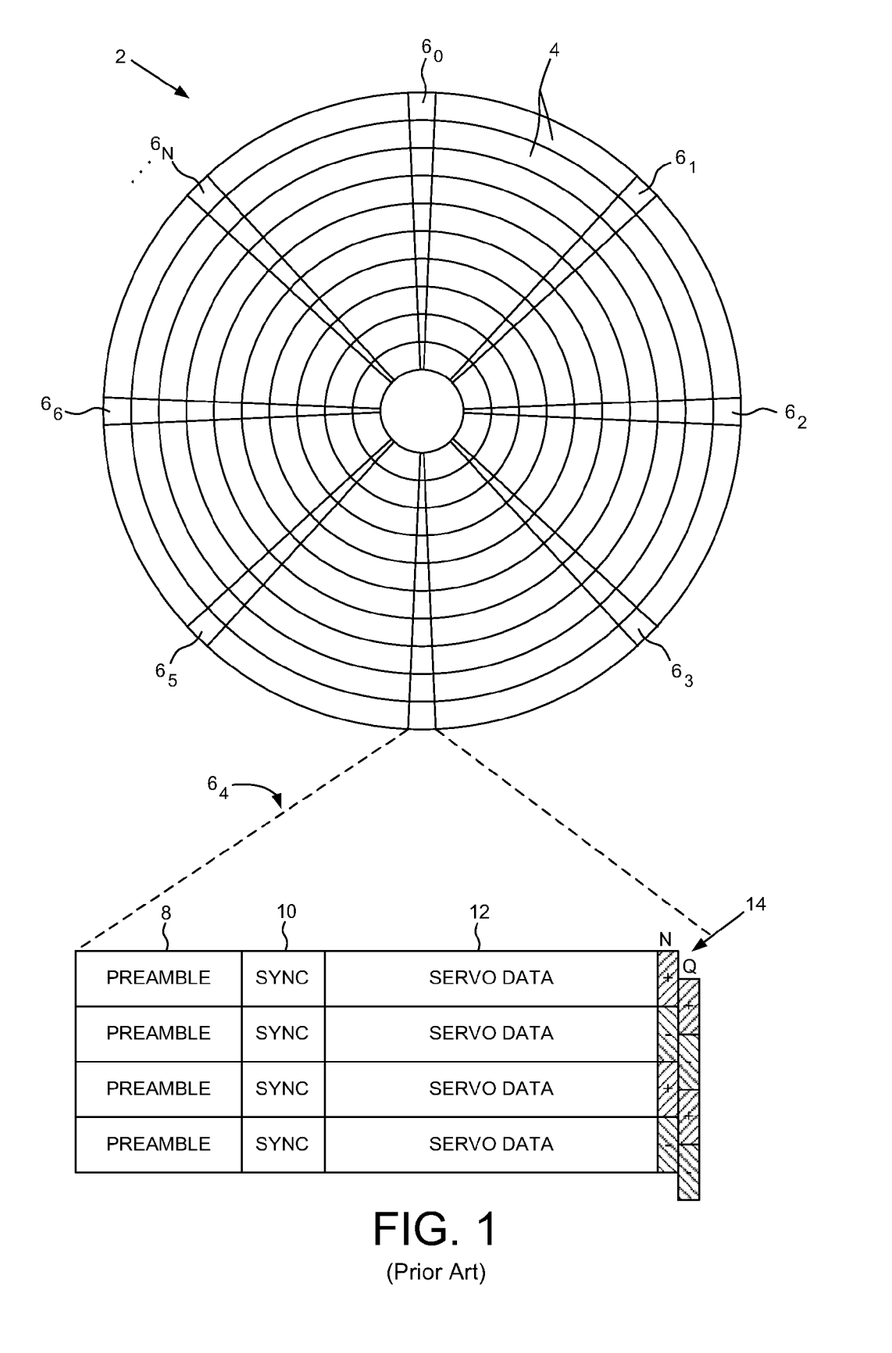
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a pre-determined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
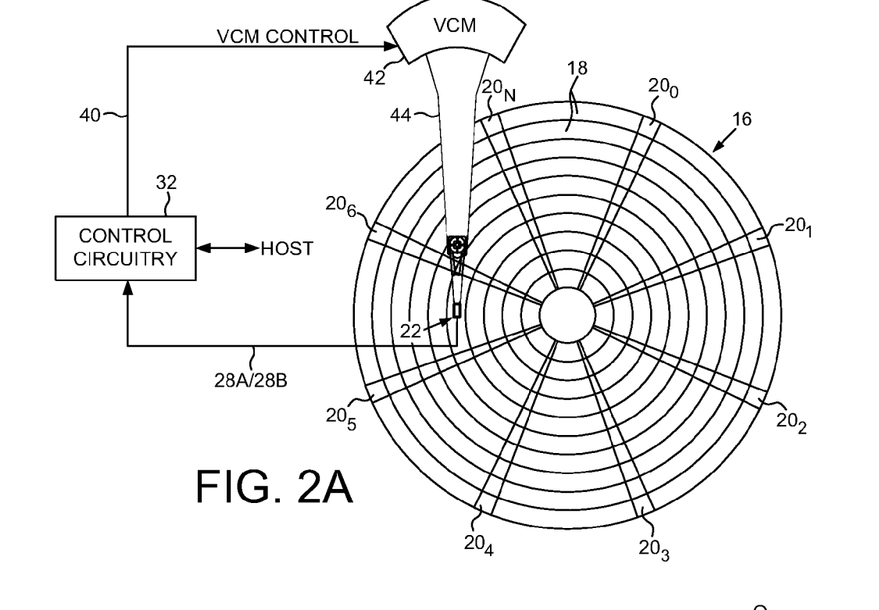
FIG. 2A shows a data storage device in the form of a disk drive according to an embodiment comprising a head actuated over a disk, wherein the head comprises a first read sensor and a second read sensor.

FIG. 2A shows a data storage device in the form of a disk drive according to an embodiment comprising a disk 16 comprising a plurality of servo tracks 18 defined by servo sectors $20_0$-$20_N$, wherein each servo sector comprises a plurality of servo bursts. The disk drive further comprises a head 22 comprising a plurality of read sensors including a first read sensor 24A, and a second read sensor 24B separated from the first read sensor 24A by a cross-track spacing (e.g., FIG. 2B). FIG. 2C shows an embodiment wherein the disk drive comprises a first servo channel 26A configured to process a first read signal 28A emanating from the first read sensor 24A to generate a first position signal 30A based on at least two servo bursts read using the first read sensor 24A, and a second servo channel 26B configured to process a second read signal 28B emanating from the second read sensor 24B to generate a second position signal 30B based on at least two servo bursts read using the second read sensor 24B. The disk drive further comprises control circuitry 32 configured to generate a position error signal (PES) 36 at block 34 (FIG. 2C) based on the first position signal 30A and the second position signal 30B, and servo the head 22 over the disk 16 at block 38 based on the PES 36.

In the embodiment of FIGS. 2A and 2C, the servo control 38 processes the PES 36 to generate a control signal 40 applied to a voice coil motor (VCM) 42 which rotates an actuator arm 44 about a pivot in order to actuate the head 22 radially over the disk 16 in a direction that reduces the PES. In another embodiment, the control circuitry 32 may also generate a control signal applied to a microactuator (not shown) in order to actuate the head 22 over the disk 16 in fine movements. Any suitable microactuator may be employed, such as a piezoelectric actuator. In addition, the microactuator may actuate the head 22 over the disk 16 in any suitable manner, such as by actuating a suspension relative to the actuator arm 44, or actuating a slider relative to the suspension. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern an example of which is shown in FIG. 2B.

In one embodiment, each servo channel 26A and 26B in FIG. 2C generates the position signals 30A and 30B based on reading the servo bursts in a conventional manner; that is, in the same manner as if the head 22 comprised a single read sensor. However, in one embodiment generating the PES based on two or more position signals generated using multiple read sensors may increase the accuracy of the PES, for example, by increasing the signal-to-noise ratio (SNR) and/or by reducing a repeatable runout (RRO) disturbance depending on neighboring track coherence. In another embodiment described below, the position signals 30A and 30B may be generated by the servo channels 26A and 26B based on a track ID in the servo sectors. That is, each servo channel may decode a detected track ID in order to improve the accuracy of the final detected track ID (e.g., by detecting and optionally correcting an error in one or both of the detected track IDs).

Figure 2B:
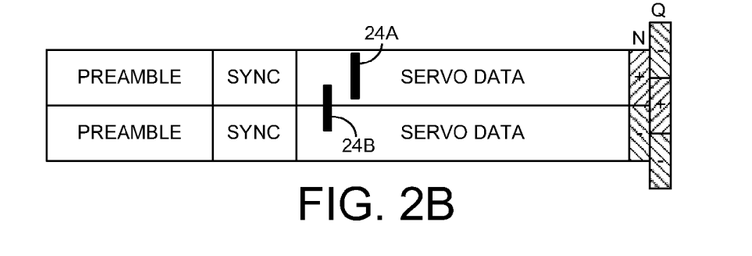
FIG. 2B shows an embodiment wherein the first read sensor and the second read sensor overlap by part of a servo track.
Figure 2C:
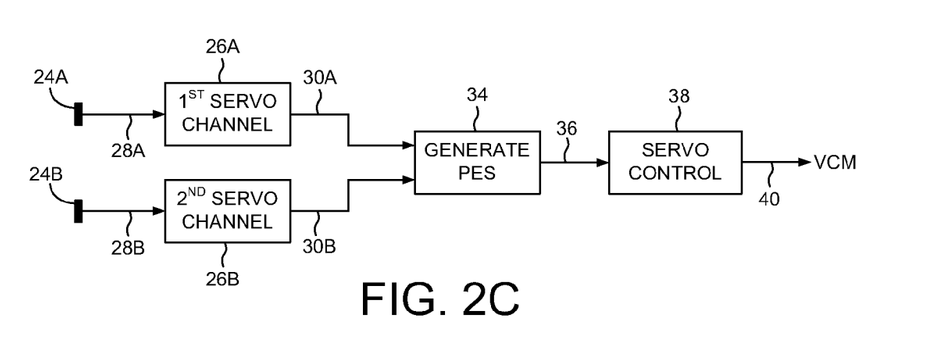
FIG. 2C shows an embodiment wherein a first servo channel processes a read signal emanating from a first read sensor to generate a first position signal based on at least two servo bursts read using the first read sensor, and a second servo channel processes a second read signal emanating from the second read sensor to generate a second position signal based on at least two servo bursts read using the second read sensor.

In the embodiment of FIG. 2B, the first and second read sensors 24A and 24B overlap in the cross-track direction such that in one embodiment both read sensors 24A and 24B may be used to demodulate a single servo track (e.g., the top servo track shown in FIG. 2B). However, the cross-track spacing between the read sensors 24A and 24B still results in a different position signal 30A and 30B generated by each servo channel relative to the servo bursts. In an embodiment described below, the PES 36 may be generated relative to one of the read sensors (e.g., the first read sensor 24A), and therefor the cross-track spacing between the read sensors 24A and 24B may be used to adjust the second position signal 30B before being combined with the first position signal 30A in order to generate the PES 36. In one embodiment, the cross-track spacing between the read sensors 24A and 24B may be large enough such that each read sensor is positioned over a different servo track and therefore read a different track ID. In this embodiment, the cross-track spacing may also be used to adjust the track ID of the second position signal 30B before combining the second position signal 30B with the first position signal 30A to generate the PES 36.

Figure 3A:
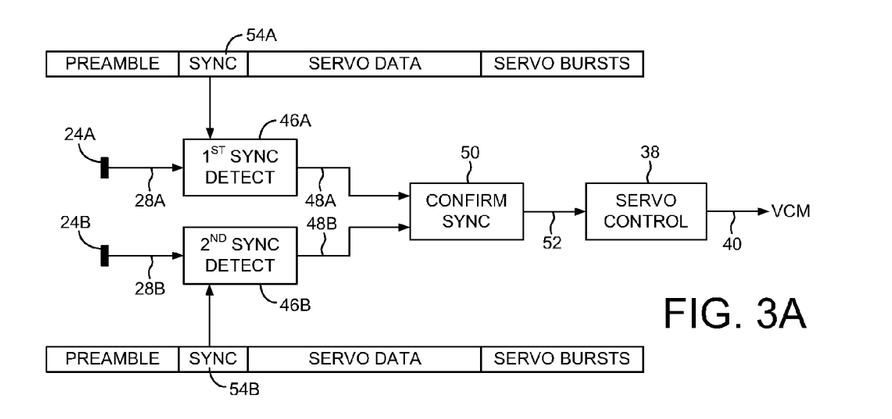
FIG. 3A shows an embodiment wherein the first servo channel comprises a first sync mark detector and the second servo channel comprises a second sync mark detector.

FIG. 3A shows an embodiment wherein the first servo channel 26A comprises a first sync mark detector 46A configured to generate a first sync mark signal 48A based on the first read signal 28A, and the second servo channel 26B comprises a second sync mark detector 46B configured to generate a second sync mark signal 48B based on the second read signal 28B. The control circuitry 32 is configured to synchronize to a servo sector at block 50 based on the first sync mark signal 48A and the second sync mark signal 48B. For example, block 50 may confirm detection of a servo sync mark based on the sync mark signals 48A and 48B and generate a sync mark found signal 52 applied to block 38 in order to demodulate the following servo data and servo bursts.

In the embodiment of FIG. 3A, the first sync mark detector 46A is configured to generate the first sync mark signal 48A based on a servo sync mark 54A, and the second sync mark detector 46B is configured to generate the second sync mark signal 48B based on a servo sync mark 54B. In one embodiment, the first and second servo sync mark 54A and 54B may be recorded in the same servo sector of a single servo track, and in another embodiment the first and second servo sync mark 54A and 54B may be recorded in different servo sectors of different servo tracks. The sync mark detectors 46A and 46B may be implemented in any suitable manner, and in one embodiment each sync mark detector correlates a detected data sequence with a target data sequence. Each sync mark detector may generate a sync mark found signal when the correlation exceeds a threshold, wherein block 50 may confirm detection of a servo sync mark when both sync mark found signals are triggered. In another embodiment, each sync mark signal 48A and 48B may represent a correlation value which may be combined at block 50 and then compared to a threshold to generate the sync mark found signal 52 applied to block 38. In one embodiment, the first and second read sensors 24A and 24B may be separated by a down-track spacing such as shown in FIG. 2B, wherein the down-track spacing may be measured and used to compensate for the delay between the first and second read signals 28A and 28B and corresponding delay between the sync mark signals 48A and 48B.

Figure 3B:
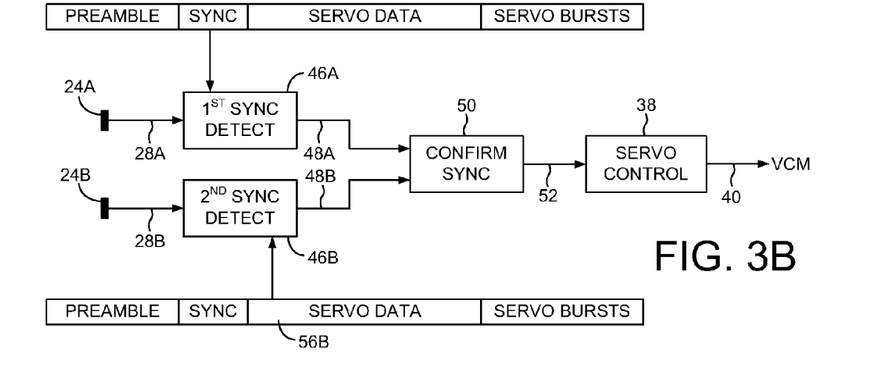
FIG. 3B shows an embodiment wherein the second sync mark detector generates a second sync mark signal based on a second plurality of bits in the servo data of a servo sector.
Figure 3C:
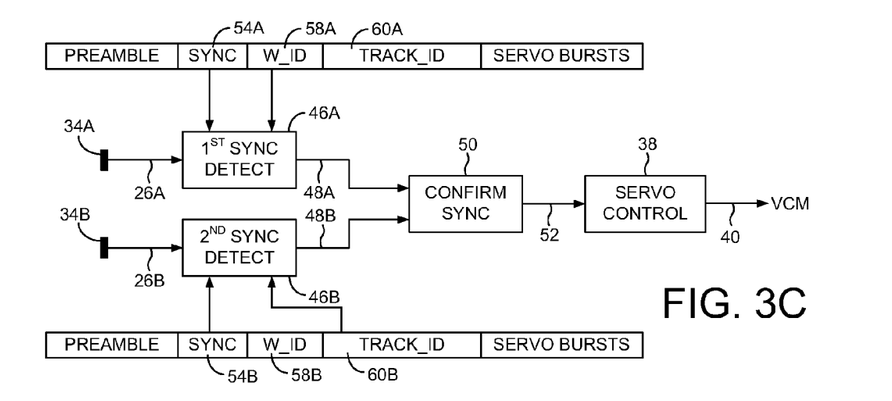
FIG. 3C shows an embodiment wherein the first sync mark detector generates a first sync mark signal based on a plurality of wedge identification (ID) bits, and the second sync mark detector generates a second sync mark signal based on a plurality of track ID bits.

FIG. 3B shows an embodiment wherein the second sync mark detector 46B generates the second sync mark signal 48B based on a plurality of bits of servo data 56B in a servo sector. For example, the servo data 56B may comprise part of a wedge ID and/or a track ID, and the target data sequence may be configured with the corresponding expected servo data as the head 22 passes over each servo sector. FIG. 3C shows an embodiment wherein the first sync mark detector 46A generates the first sync mark signal 48A based on the first sync mark 54A and a plurality of bits of a wedge ID 58A, and the second sync mark detector generates the second sync mark signal 48B based on the second sync mark 54B and a plurality of bits of a track ID 60B (e.g., the high order bits of the track ID).

In one embodiment, implementing a sync mark detector in each servo channel improves the accuracy of synchronizing to a servo sector due to the increase in SNR and/or the correlation length. In another embodiment, the increased accuracy in synchronizing to the servo sectors may enable the servo sync mark to be recorded with fewer bits, thereby increasing the capacity of the disk 16 by improving the format efficiency.

Figure 4:
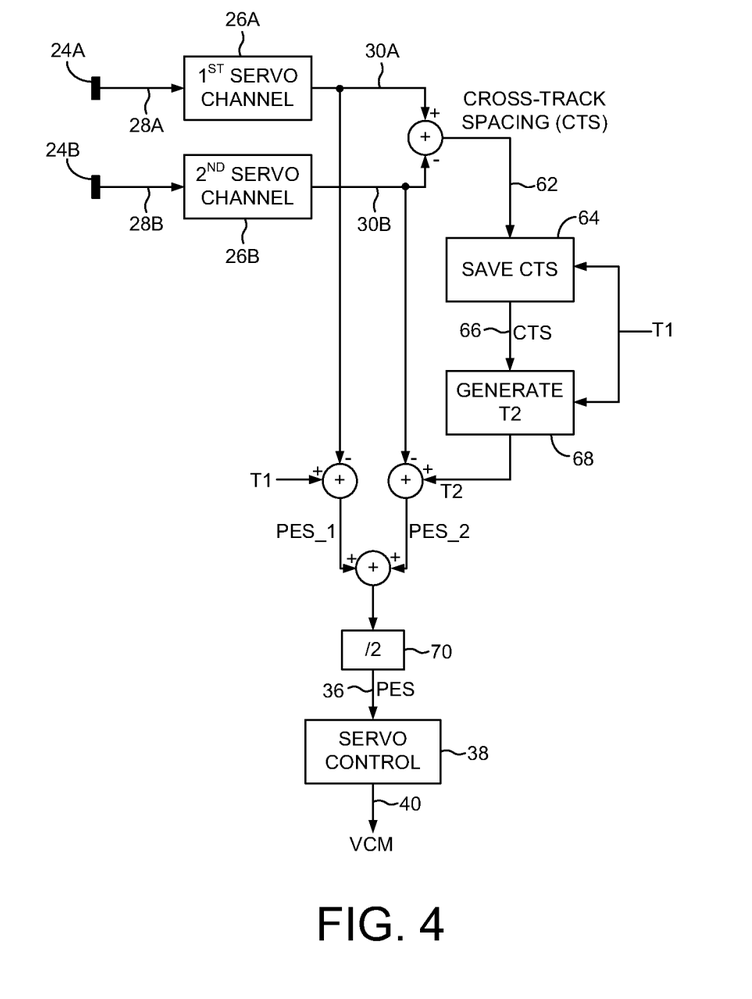
FIG. 4 shows an embodiment wherein the cross-track spacing between the read sensors is measured and then used to generate the PES.

FIG. 4 illustrates an embodiment wherein the cross-track spacing 62 between the first and second read sensors 24A and 24B is measured as the difference between the first position signal 30A generated by the first servo channel 26A and the second position signal 30B generated by the second servo channel 26B, where each position signal may be generated based on the servo bursts and optionally a track ID of different servo tracks. In one embodiment, the cross-track spacing may be measured at a particular radial location by taking a measurement over multiple servo sectors, and then averaging the measurements. In one embodiment, a similar cross-track spacing measurement may be generated over a plurality of different radial locations since the cross-track spacing may change as the skew angle of the head 22 changes. The resulting measurements may be saved at block 64, or optionally the measurements may be curve-fitted to a suitable function (e.g., a polynomial) which may be saved at block 64. During normal access operations (write/read operations), a first target radial location T1 for the first read sensor 24A may be input into block 64 which outputs the corresponding cross-track spacing measurement 66. A second target radial location T2 for the second read sensor 24B is generated at block 68 based on the corresponding cross-track spacing measurement 66. A first PES_1 is generated as the difference between the first target radial location T1 and the first position signal 30A, and a second PES_2 is generated as the difference between the second target radial location T2 and the second position signal 30B. The PES_1 and PES_2 are summed, and the result divided by two 70 to generate the PES 36 used to servo the head 22 at block 38.

Figure 5A:
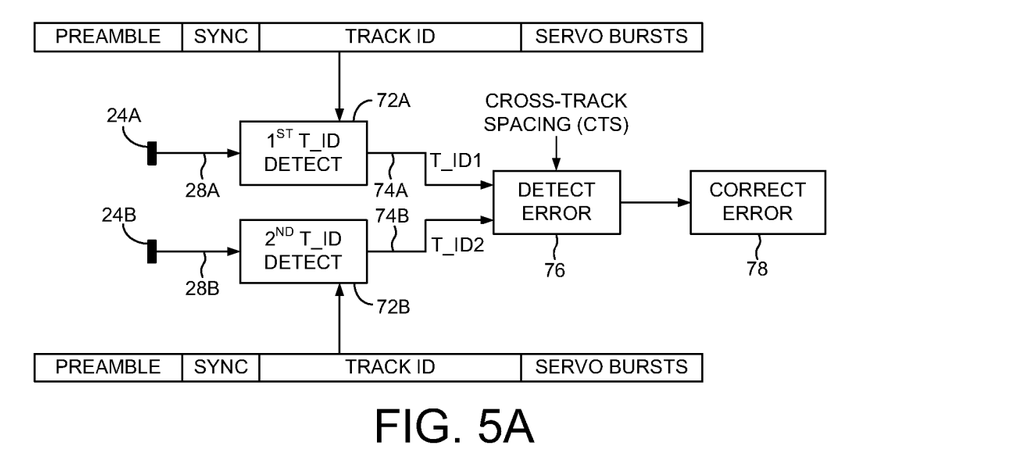
FIG. 5A shows an embodiment wherein the first servo channel comprises a first track ID detector configured to generate a first detected track ID, the second servo channel comprises a second track ID detector configured to generate a second detected track ID, and an error in at least one of the first detected track ID and the second detected track ID is detected based on the cross-track spacing between the first and second read sensors.

FIG. 5A shows an embodiment wherein the first servo channel 26A comprises a first track ID detector 72A configured to generate a first detected track ID 74A and the second servo channel 26B comprises a second track ID detector 72B configured to generate a second detected track ID 74B. The control circuitry 32 is further configured to detect an error at block 76 in at least one of the first detected track ID 74A and the second detected track ID 74B based on the cross-track spacing 66 between the first and second read sensors 24A and 24B. In one embodiment, the error detected at block 76 may be corrected at block 78 using any suitable technique.

Figure 5B:
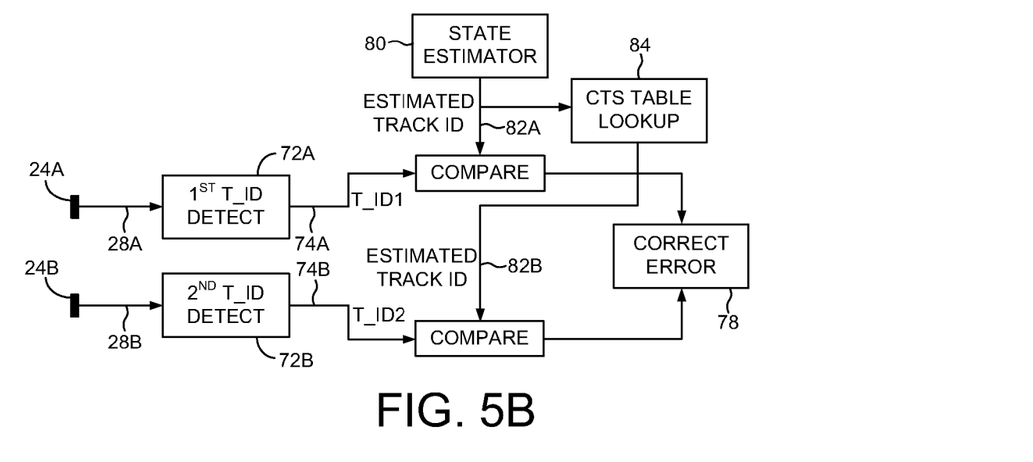
FIG. 5B shows an embodiment for detecting and correcting an error in at least one of the detected track IDs.

FIG. 5B illustrates an embodiment for detecting and correcting an error in at least one of the detected track IDs 74A and 74B. A state estimator 80 generates a first estimated track ID 82A based on the expected radial location of the first read sensor 24A. The first estimated track ID 82A is input into block 84 which generates a second estimated track ID 82B based on the measured cross-track spacing at that radial location. In one embodiment, the first estimated track ID 82A may match the second estimated track ID 82B if both read sensors 24A and 24B are expected to be over the same servo track. If the read sensors 24A and 24B are expected to be over different servo tracks, then the second estimated track ID 82B will be different than the first estimated track ID 82A. Each of the estimated track IDs 82A and 82B are compared to the corresponding detected track IDs 74A and 74B, and the result is processed by block 78. In one embodiment, the proximity of each of the detected track IDs 74A and 74B to the estimated track IDs 82A and 82B is used to detect and/or correct an error in one of the detected track IDs 74A and 74B. For example, the detected track ID 74A or 74B that is closest to the corresponding estimated track ID 82A or 82B may be determined to be error-free and therefore used to correct the other detected track ID based on the cross-track spacing. In another embodiment, the detected track IDs 74A and 74B and the estimated track IDs 82A and 82B, together with a predetermined number of track IDs proximate the estimated track IDs 82A and 82B, may be evaluated in their corresponding Gray code domain in order to detect and/or correct an error in at least one of the detected track IDs 74A and 74B.

Figure 6:
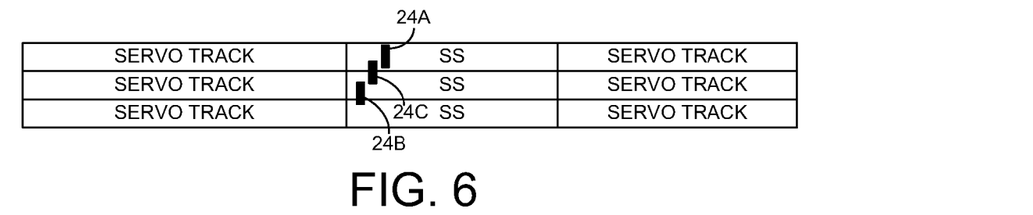
FIG. 6 shows an embodiment wherein the first read sensor is separated from the second read sensor by at least one servo track, and a third read sensor is fabricated between the first and second read sensors.

FIG. 6 illustrates an embodiment wherein the head 22 comprises a third read sensor 24C fabricated between the first read sensor 24A and the second read sensor 24B along a cross-track direction such that a cross-track spacing between the first and second read sensors 24A and 24B is greater than a cross-track spacing between the first read sensor 24A and the third read sensor 24C. In other words, in one embodiment the control circuitry 32 may process the read signals from the read sensors that are farthest apart along the cross-track direction which may help reduce the RRO disturbance depending on neighboring track coherence. FIG. 6 also illustrates an embodiment wherein the cross-track spacing between the first read sensor 24A and the second read sensor 24B comprises at least one servo track, and in one embodiment may comprise an integer number of servo tracks plus a fraction of a servo track. In addition as described above, the cross-track spacing between the first and second read sensors 24A and 24B may vary based on the skew angle of the head 22 which changes as the head 22 changes radial locations.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of servo tracks defined by servo sectors, wherein each servo sector comprises a plurality of servo bursts;
   a head comprising a plurality of read sensors including a first read sensor, and a second read sensor separated from the first read sensor by a cross-track spacing;
   a first servo channel configured to process a first read signal emanating from the first read sensor to generate a first position signal based on at least two servo bursts read using the first read sensor;
   a second servo channel configured to process a second read signal emanating from the second read sensor to generate a second position signal based on at least two servo bursts read using the second read sensor; and
   control circuitry configured to:

generate a position error signal (PES) based on the first position signal and the second position signal; and
servo the head over the disk based on the PES.

2. The data storage device as recited in claim 1, wherein:
each servo sector comprises a track ID;
the first servo channel is configured to generate the first position signal based on a track ID; and
the second servo channel is configured to generate the second position signal based on a track ID.

3. The data storage device as recited in claim 1, wherein:
the first servo channel comprises a first sync mark detector configured to generate a first sync mark signal based on the first read signal;
the second servo channel comprises a second sync mark detector configured to generate a second sync mark signal based on the second read signal; and
the control circuitry is configured to synchronize to a servo sector based on the first sync mark signal and the second sync mark signal.

4. The data storage device as recited in claim 3, wherein:
each servo sector comprises a servo sync mark;
the first sync mark detector is configured to generate the first sync mark signal based on a servo sync mark; and
the second sync mark detector is configured to generate the second sync mark signal based on a servo sync mark.

5. The data storage device as recited in claim 3, wherein:
each servo sector comprises a servo sync mark and servo data; and
the first sync mark detector is configured to generate the first sync mark signal based on a first plurality of bits of the servo data of a servo sector.

6. The data storage device as recited in claim 5, wherein the second sync mark detector is configured to generate the second sync mark signal based on a second plurality of bits of the servo data of a servo sector.

7. The data storage device as recited in claim 6, wherein:
the first plurality of bits of the servo data comprises at least two bits of a wedge ID; and
the second plurality of bits of the servo data comprises at least two bits of a track ID.

8. The data storage device as recited in claim 1, wherein the control circuitry is further configured to measure the cross-track spacing based on the first position signal and the second position signal.

9. The data storage device as recited in claim 1, wherein:
the first servo sector comprises a first track ID;
the second servo sector comprises a second track ID;
the first servo channel comprises a first track ID detector configured to generate a first detected track ID;
the second servo channel comprises a second track ID detector configured to generate a second detected track ID; and
the control circuitry is further configured to detect an error in at least one of the first detected track ID and the second detected track ID based on the cross-track spacing between the first and second read sensors.

10. The data storage device as recited in claim 9, wherein the control circuitry is further configured to correct the error based on a proximity of at least one of the first detected track ID and the second detected track ID to at least one estimated track ID.

11. The data storage device as recited in claim 1, wherein the control circuitry is further configured to:
measure the cross-track spacing between the first and second read sensors; and
generate the PES based on the measured cross-track spacing.

12. The data storage device as recited in claim 1, wherein the head comprises a third read sensor fabricated between the first read sensor and the second read sensor along a cross-track direction such that a cross-track spacing between the first and second read sensors is greater than a cross-track spacing between the first read sensor and the third read sensor.

13. The data storage device as recited in claim 1, wherein the cross-track spacing between the first read sensor and the second read sensor comprises at least one servo track.

14. A method of operating a data storage device, the method comprising:
processing a first read signal emanating from a first read sensor of a head to generate a first position signal based on at least two servo bursts read using the first read sensor;
processing a second read signal emanating from a second read sensor of the head to generate a second position signal based on at least two servo bursts read using the second read sensor;
generating a position error signal (PES) based on the first position signal and the second position signal; and
servoing the head over the disk based on the PES.

15. The method as recited in claim 14, further comprising:
generating the first position signal based on a track ID; and
generating the second position signal based on a track ID.

16. The method as recited in claim 14, further comprising:
generating a first sync mark signal based on the first read signal;
generating a second sync mark signal based on the second read signal; and
synchronizing to a servo sector based on the first sync mark signal and the second sync mark signal.

17. The method as recited in claim 16, further comprising generating the first sync mark signal based on a first plurality of bits of servo data of a servo sector.

18. The method as recited in claim 17, further comprising generating the second sync mark signal based on a second plurality of bits of servo data of a servo sector.

19. The method as recited in claim 18, wherein:
the first plurality of bits of the servo data comprises at least two bits of a wedge ID; and
the second plurality of bits of the servo data comprises at least two bits of a track ID.

20. The method as recited in claim 14, further comprising measuring a cross-track spacing between the first and second read sensors based on the first position signal and the second position signal.

21. The method as recited in claim 14, further comprising:
generating a first detected track ID;
generating a second detected track ID; and
detecting an error in at least one of the first detected track ID and the second detected track ID based on a cross-track spacing between the first and second read sensors.

22. The method as recited in claim 21, further comprising correcting the error based on a proximity of at least one of the first detected track ID and the second detected track ID to at least one estimated track ID.

23. The method as recited in claim 14, further comprising:
measuring the cross-track spacing between the first and second read sensors; and
generating the PES based on the measured cross-track spacing.

24. The method as recited in claim 14, wherein the head comprises a third read sensor fabricated between the first read sensor and the second read sensor along a cross-track direction such that a cross-track spacing between the first and second read sensors is greater than a cross-track spacing between the first read sensor and the third read sensor.

25. The method as recited in claim 14, wherein a cross-track spacing between the first read sensor and the second read sensor comprises at least one servo track.

\* \* \* \* \*